Sept. 29, 1964    H. C. WORD    3,150,417
SEED COTTON CLEANING MACHINE
Filed Jan. 12, 1962
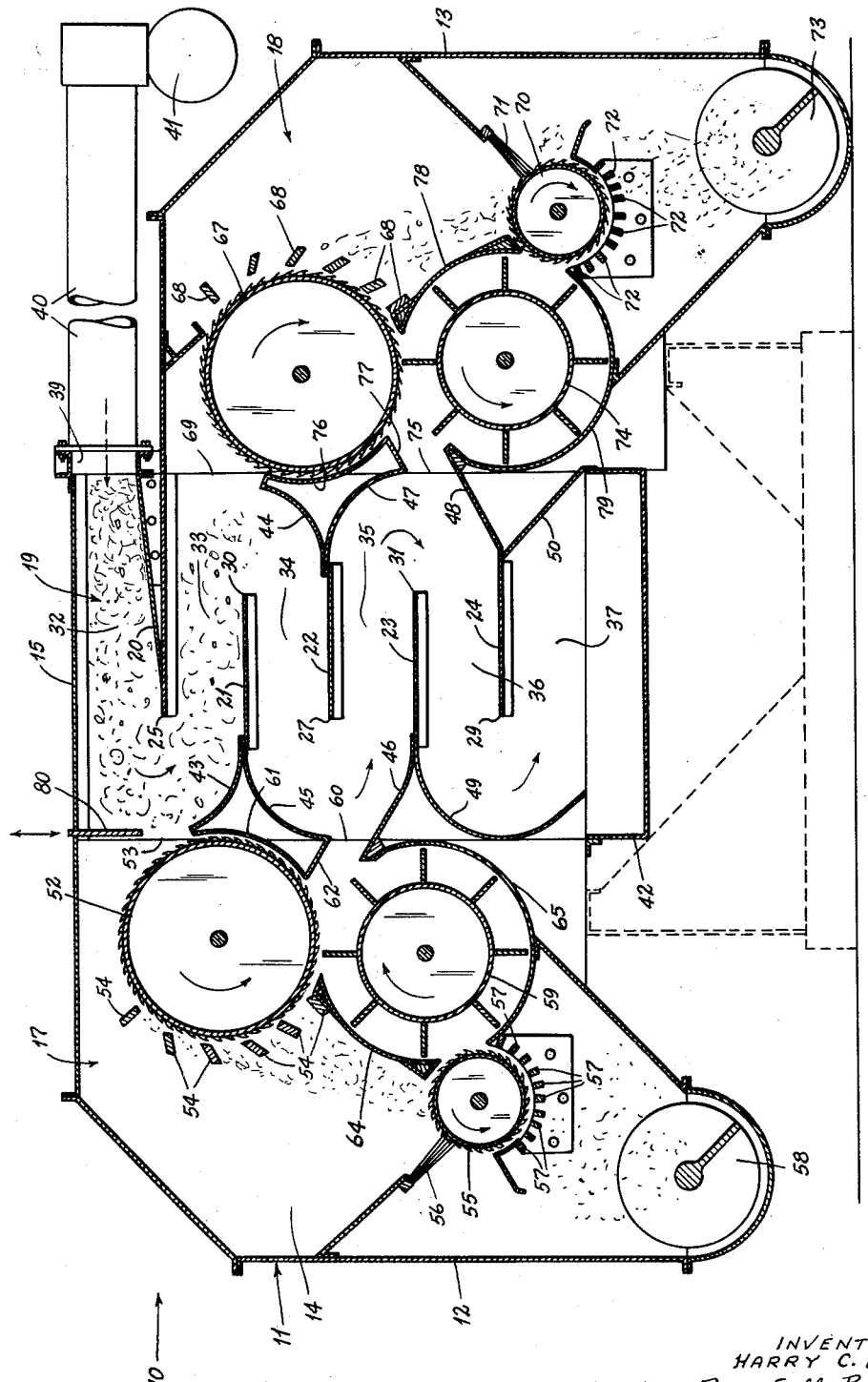
INVENTOR:
HARRY C. WORD,
BY Kingsland, Rogers, Ezell & Robbins
ATTORNEYS

3,150,417
SEED COTTON CLEANING MACHINE
Harry C. Word, Dallas, Tex., assignor to John E. Mitchell Company, Dallas, Tex., a corporation of Missouri
Filed Jan. 12, 1962, Ser. No. 165,740
5 Claims. (Cl. 19—203)

This invention relates to a cotton cleaning machine for rough cleaning field cotton, and particularly to a cotton cleaning machine that is connected directly into a conventional cotton conveying forced air conduit.

It is common in the cotton processing art to use forced air conduits for conveying cotton, but the conventional cotton cleaner receives cotton from such a conduit, and thereafter, separate means are used to move the cotton through the cleaner. In the invention, the forced air stream of cotton is continued through the cleaning machine; the cotton is intercepted for cleaning and the cleaned cotton is returned to the air stream which flows the cotton out of the machine. The overall flow of cotton through the cleaning machine is uninterrupted.

The cotton cleaning machine has a housing with a cotton passage through the center and two cleaning stations on opposite sides thereof. Each cleaning station has a cleaning saw cylinder which picks up cotton from the central passage, beater bars for separating trash from the cotton, and a reclaimer saw cylinder for recovering the cotton that is separated with the trash from the cleaning saw cylinder. A doffer doffs cotton from the cleaning and reclaimer saw cylinders and returns the cleaned cotton to the central passage.

The cotton passage is defined by a series of horizontal shelves or baffles which divide the passage into a plurality of series connected, virtually superposed passage rows. The inlet to the cotton passage is connected to a forced air conduit of the kind conventionally used to convey cotton. Such conduits are provided with blowers that generate a sufficient air draft to keep cotton moving through the conduits. All of the cotton passes through the uppermost passage section where approximately half of it is picked up by one of the cleaning saw cylinders. The other half is rejected and is dropped to the next passage section through which it is blown to the other cleaning saw cylinder. An adjustable gate is movable across the path of cotton flowing to the first cleaning saw cylinder to regulate the division of cotton between the two cleaning saw cylinders. The gate, and the gathering of cotton that passes it, minimize the escape of air from the cotton passage.

An object of this invention is to provide a cotton cleaning machine that connects to a forced air conduit and utilizes the air stream to convey cotton through the machine, with means for intercepting the cotton to clean it and means to return the cleaned cotton to the air stream for discharge from the machine.

Another object is to provide a cotton cleaner that is connected to a forced air cotton conveying conduit and utilizes the air draft to convey cotton through the machine with means to interrupt the flow of cotton to clean it but with an overall uninterrupted flow of cotton through the machine.

Another object is to provide a cotton cleaning machine having an inlet for connecting to a forced air cotton conveying conduit, with a passage through the machine through which the cotton is carried by the air draft, and with cotton cleaning means on opposite sides of the passage for intercepting the cotton to clean it and then returning the cotton to the passage. It is also an object to provide means to regulate the amount of cotton intercepted by each cleaning means.

The drawing is a front elevation view in section of the cotton cleaning machine.

As shown in the drawing, the cotton cleaning machine 10 has a housing 11 including the side walls 12 and 13, a back wall 14, a front wall (opposite the back wall 14, but not shown in the drawing) and a top wall 15.

The cotton cleaning machine 10 is divided into three sections. A first cleaning station 17 is positioned toward one side 12 of the housing; a second cleaning station 18 is positioned toward the opposite side 13 of the housing; and a cotton passage section 19 in the middle of the housing separates the cleaning stations 17 and 18.

In the cotton passage section 19, there are a plurality of vertically spaced, generally horizontal shelves 20, 21, 22, 23 and 24. As shown in the drawing, these shelves 20, 21, 22, 23 and 24 are horizontally staggered with alternate ones 20, 22 and 24 extending from the second cleaning station 18 toward the first cleaning station, but having their edges 25, 27 and 29, respectively, spaced from the first cleaning station 17. The other shelves 21 and 23 extend from the first cleaning station 17 toward the second cleaning station, but their edges 30 and 31, respectively, are spaced from the second cleaning station 18. Thus, these shelves 20 through 24 divide the cotton passage section 19 into a plurality of horizontal rows 32, 33, 34, 35, 36 and 37, all connected together in series by virtue of the staggered positions of the shelves.

There is a cotton inlet 39 through the housing for connecting a conventional cotton conveying conduit 40 to the uppermost cotton passage row 32. As schematically shown in the drawing, the cotton conveying conduit is connected to an air blower 41. Cotton flows from the cotton conveying conduit 40 through the inlet 39 into the passage section 19, and under the continued influence of the air draft from the blower 41, flows across the shelf 20 and past the end 25 thereof to the shelf 21. Then the air continues to blow the cotton past the end 30 of the shelf 21 onto the shelf 22. In this manner, except for interruptions for cleaning as will be described, the cotton continues through the passage section 19 until it reaches the lowermost passage row 37. It is then directed to a cotton outlet 42.

There is a baffle plate 43 at the end of the shelf 21 opposite the edge 25 of the shelf 20. The baffle plate 43 directs the path of cotton and blown air around the end of the shelf 20, streamlining its change of direction. A similar baffle 44 at the end of the shelf 22 directs the cotton and air around the end 30 of the shelf 21. Baffles 45 and 56 opposite the end 27 of the shelf 22, baffles 47 and 48 opposite the end 31 of the shelf 23, a baffle 49 opposite the end 29 of the shelf 24, and a baffle 50 below the shelf 24 direct the cotton and air around the remaining bends in the cotton passage.

The cleaning station 17 comprises a saw cylinder 52 rotatably supported between the front and back walls of the housing 11. The saw cylinder 52 is positioned opposite the end of the uppermost cotton passage row 32 defined between the top wall 15 and the shelf 20. There is an opening 53 at the end of the passage row 32 through which cotton is blown to engage the teeth of the saw cylinder 52.

A plurality of grid bars 54 are positioned around a part of the periphery of the saw cylinder 52 to separate sticks, trash, earth and other foreign matter from the cotton. This trash and foreign matter is dropped toward a reclaimer saw cylinder 55. The reclaimer saw cylinder 55 intercepts cotton dropped with the trash and foreign matter, but expels the trash and foreign matter past a brush 56. There are a plurality of grid bars 57 across the underside of the reclaimer saw cylinder 55 to help expel the trash and foreign matter while the cotton is carried by the reclaimer saw cylinder.

A screw conveyor 58 carries the trash and foreign matter out of the housing.

A doffer wheel 59 is positioned to rotate between the cleaning saw cylinder 52 and the reclaimer saw cylinder 55. The doffer doffs cotton from both of these saw cylinders. There is an opening 60 between the curved baffles 45 and 46 through which the doffer 59 returns cotton to the cotton stream as it enters the passage row 35 between the shelves 22 and 23. (Actually, this stream is principally an air stream devoid of cotton as will be apparent hereinafter.)

In the cleaning section 17 there are various baffles for assuring proper operation. A curved baffle 61 cooperates with a short wall 62 connected between the lower end of the baffle 61 and the lower end of the curved baffle 45 to strip cotton from the cleaning saw cylinder 52 to be certain that the cotton is either expelled through the opening 60 or is picked up by the doffer 59. There are curved baffles 64 and 65 on opposite sides of the doffer 59 to prevent the escape of cotton from the doffer except through the opening 60 into the cotton passage section 19.

Like the first cleaning station 17, the second cleaning station 18 has a cleaning saw cylinder 67 with grid bars 68 spaced along a side of the saw cylinder. An opening 69 opposite the shelf 21 admits cotton to the saw cylinder 67. A reclaimer saw cylinder 70, in combination with a brush 71 and grid bars 72, reclaims cotton dropped from the saw cylinder 67 while passing sticks, trash and other foreign matter to a screw conveyor 73. A doffer 74 doffs cotton from both the cleaning saw cylinder 67 and the reclaimer saw cylinder 70 and returns it through an opening 75 to the cotton passage row 36 above the shelf 24. A baffle 76 and plate 77 guide cotton into the opening 75, and a pair of baffles 78 and 79 prevent the escape of cotton from the doffer until it is discharged through the opening 75 into the stream of cotton in the cotton passage section 19.

A wall 80 is supported between the front and back walls of the housing 11. The wall 80 is positioned opposite the end 25 of the upper shelf 20 and defines the upper edge of the opening 53. The wall is vertically slidable to adjust the size of the opening 53 whereby the amount of cotton entering the first cleaning station 17 is regulated.

In operation, cotton is blown through the conduit 40 by the blower 41. The blown air stream carries the cotton through the inlet 39 into the upper row 32 of the cotton passage section 19. As the cotton is blown across the shelf 20, some of it hits the wall 80 while some flows beneath the wall 80 through the opening 53 and is picked up by the cleaning saw cylinder 52. The wall 80 is normally adjusted so that half the cotton is picked up by the cleaning saw cylinder 52 and half is rejected. The rejected half of cotton drops to the shelf 21 and is blown through the opening 69 onto the cleaning saw cylinder 67. All of the cotton should be intercepted by the first and second cleaning stations 17 and 18, but if a small portion is rejected by the second cleaning station, it continues with the air stream around the end 30 of the shelf 21 and across the shelf 22.

The cotton in each cleaning station 17 and 18 is cleaned in the known maner as has been indicated. The cotton cleaned by the cleaning station 17 is returned through the opening 60 to the air stream. That cotton is then blown across the shelf 23 and is joined by cotton thrown through the opening 75 by the doffer 74 of the second cleaning station 18. The collected cotton is thereafter blown across the shelf 24 and finally discharged through the outlet 42.

Ordinarily, the outlet 42 is connected to another cotton conveying conduit and, perhaps with additional blower means, is blown to the gin stand for thorough cleaning and ginning.

Various changes and modifications may be made within the process of this invention as will be readily apparent to those skilled in the art. Such changes and modifications are within the scope and teaching of this invention as defined by the claims appended hereto.

What is claimed is:

1. A cotton cleaning machine comprising a housing having an inlet adjacent the top thereof for connecting to a forced air cotton delivery duct, an outlet adjacent the bottom of the housing, a plurality of vertically superposed horizontal passage sections including an uppermost passage section connected between the inlet and the outlet, the passage sections being connected together in series to provide flow of cotton from the inlet to the outlet under the influence of the forced air, first and second cleaning stations positioned at opposite ends of the passage sections, the uppermost passage section having an end opposite the inlet opened to the first cleaning station for delivering cotton thereto, the passage section immediately below the uppermost one having an end opened to the second cleaning station for delivering cotton thereto, another passage section having an end opened to the first cleaning station for receiving cleaned cotton therefrom and still another passage section having an end opened to the second cleaning station for receiving cleaned cotton therefrom.

2. A cotton cleaning machine comprising a housing having front and back walls and upper and lower ends, first and second wall means spaced apart and defining a space therebetween, a first cleaning station adjacent the first wall means, a second cleaning station adjacent the second wall means, the first and second wall means being between the first and second cleaning stations, the first and second wall means extending between the front and back walls, an inlet to the space adjacent the upper end of the housing adapted to be connected to a forced air cotton conveyor to receive cotton into the housing, a generally horizontal first shelf extending from the inlet toward the first cleaning station, but terminating short of the first wall means, an opening through the first wall means for admitting cotton from the first shelf to the first cleaning station, a generally horizontal second shelf below the first shelf extending from the first wall means toward the second cleaning station but terminating short of the second wall means, for receiving cotton from the first shelf rejected by the first cleaning station, an opening through the second wall means for admitting cotton from the second shelf to the second cleaning station, a generally horizontal third shelf extending from the first wall means toward the second cleaning station but terminating short of the second wall means, an opening through the first wall means above the third shelf for admitting cotton from the first cleaning station onto the third shelf, a generally horizontal fourth shelf extending from the second wall means toward but terminating short of the first wall means for receiving cotton from the third shelf, an opening through the second wall means for admitting cotton from the second cleaning station onto the fourth shelf to join the cotton received from the third shelf, and an outlet from the housing positioned to receive cotton from the fourth shelf.

3. The cotton cleaning machine of claim 2 including a fifth shelf between the second and third shelf and extending from the second wall means toward but terminating short of the first wall means for directing whatever cotton is rejected by the second cleaning station, as well as air from the second shelf, to the third shelf.

4. A cotton cleaning machine comprising a housing, an inlet through a side of the housing, an outlet through another side of the housing, a cotton passage through the housing connected between the inlet and the outlet, means for connecting the inlet to an air blast cotton conveyor for utilizing the air blast to convey cotton through the cotton passage, a first cleaning station adjacent the cotton passage for receiving part of the cotton introduced through the inlet, a second cleaning station adjacent the cotton passage for receiving the cotton not received by the first cleaning station, means toward the inlet relative to the first and second cleaning stations for causing some of the cotton introduced through the inlet to be intercepted and initially cleaned by the first cleaning station and for causing the rest of the cotton to be intercepted and initially cleaned by the second cleaning station, means for returning cotton from the first cleaning station to the cotton passage, and means for returning cotton from the second cleaning station to the passage.

5. A cotton cleaning machine comprising a housing, an inlet through a side of the housing, an outlet through another side of the housing, a cotton passage through the housing connected between the inlet and the outlet, means for connecting the inlet to an air blast cotton conveyor for utilizing the air blast to convey cotton through the cotton passage, a first cotton cleaning station near the inlet side of the cotton passage for intercepting part of the cotton introduced into the inlet, a second cleaning station between the first cleaning station and the outlet for intercepting substantially all the cotton not intercepted by the first cleaning station, adjustable baffle means for regulating the amount of cotton intercepted by the first cleaning station for equalizing the cleaning load on the first and second cleaning stations, means for returning cotton from the first cleaning station to the passage and means for returning cotton from the second cleaning station to the passage.

References Cited in the file of this patent
UNITED STATES PATENTS

| | | |
|---|---|---|
| 2,214,680 | Sims | Sept. 10, 1940 |
| 2,446,130 | Day | July 27, 1948 |
| 3,046,611 | Vandergriff | July 31, 1962 |
| 3,069,730 | Vandergriff | Dec. 25, 1962 |
| 3,086,254 | Mitchell et al. | Apr. 23, 1963 |